United States Patent [19]

Zellmer

[11] 4,263,644

[45] Apr. 21, 1981

[54] CURRENT LIMITER FOR SWITCHED DC-TO-DC CONVERTER

[75] Inventor: Neale A. Zellmer, Belmont, Calif.

[73] Assignee: GTE Automatic Electric Laboratories, Inc., Northlake, Ill.

[21] Appl. No.: 39,727

[22] Filed: May 17, 1979

[51] Int. Cl.³ .......................................... H02H 1/122
[52] U.S. Cl. ...................................... 363/26; 363/56
[58] Field of Search ...................... 363/26, 41, 55, 56, 363/57

[56] References Cited

U.S. PATENT DOCUMENTS

| | | | |
|---|---|---|---|
| 3,252,073 | 5/1966 | Maine | 363/55 X |
| 3,946,301 | 3/1976 | Love | 363/56 |
| 3,950,691 | 4/1976 | Ohba | 363/56 |
| 4,128,866 | 12/1978 | Doerre | 363/56 X |
| 4,196,320 | 4/1980 | Townsend | 363/26 X |
| 4,204,266 | 5/1980 | Kammiller et al. | 363/26 X |

OTHER PUBLICATIONS

"Pulse-Width Modulated DC-to-DC Converter", S. E. Bigbie & R. W. Carlsten IBM Technical Disclosure Bulletin, vol. 19, No. 5, Oct. 1976, pp. 1530-1533.
"Packaged Pulse-Width Modulator Simplifies Series-Switching Regulator Design" John Sualbe, Electronics Design 19, Sep. 14, 1972, p. 162.
"Constant Period With Variable Duty Cycle Obtained From 555 With Single Control", Robert W. Hilshu, Electronics Design 14, Jul. 5, 1975, p. 72.
"DC-to-DC Converter Uses IC Timer", Robert Solomon and Robert Broadway, Electronic Design News, Sep. 5, 1973, pp. 87-91.
"Switching Supply Converts −60V to +5V and ±6.3V with 83% Efficiency", Philip M. Cowett, Electronic Design 2, Jan. 18, 1978, p. 106.

Primary Examiner—William M. Shoop
Attorney, Agent, or Firm—Russell A. Cannon

[57] ABSTRACT

A switched DC-to-DC converter in a power supply is powered by input line current from an external power source and driven by voltage pulses from a variable duty cycle pulse width modulator for converting a DC input voltage to a DC supply voltage of a different value that is applied to a load impedance. A comparator monitors the supply voltage for producing an error voltage that biases the modulator for adjusting the width of the voltage pulses, and thus the duty cycle of the converter, for maintaining the supply voltage relatively constant. An RC circuit integrates the voltage pulses for producing an indication of the average value thereof, which is directly related to the value of line current drawn by the converter. When the average value of voltage pulses exceeds a reference voltage, the value of bias voltage is limited for establishing the maximum width of voltage pulses and duty cycle of the converter, and thereby limit the maximum line current drawn by the power supply.

12 Claims, 1 Drawing Figure

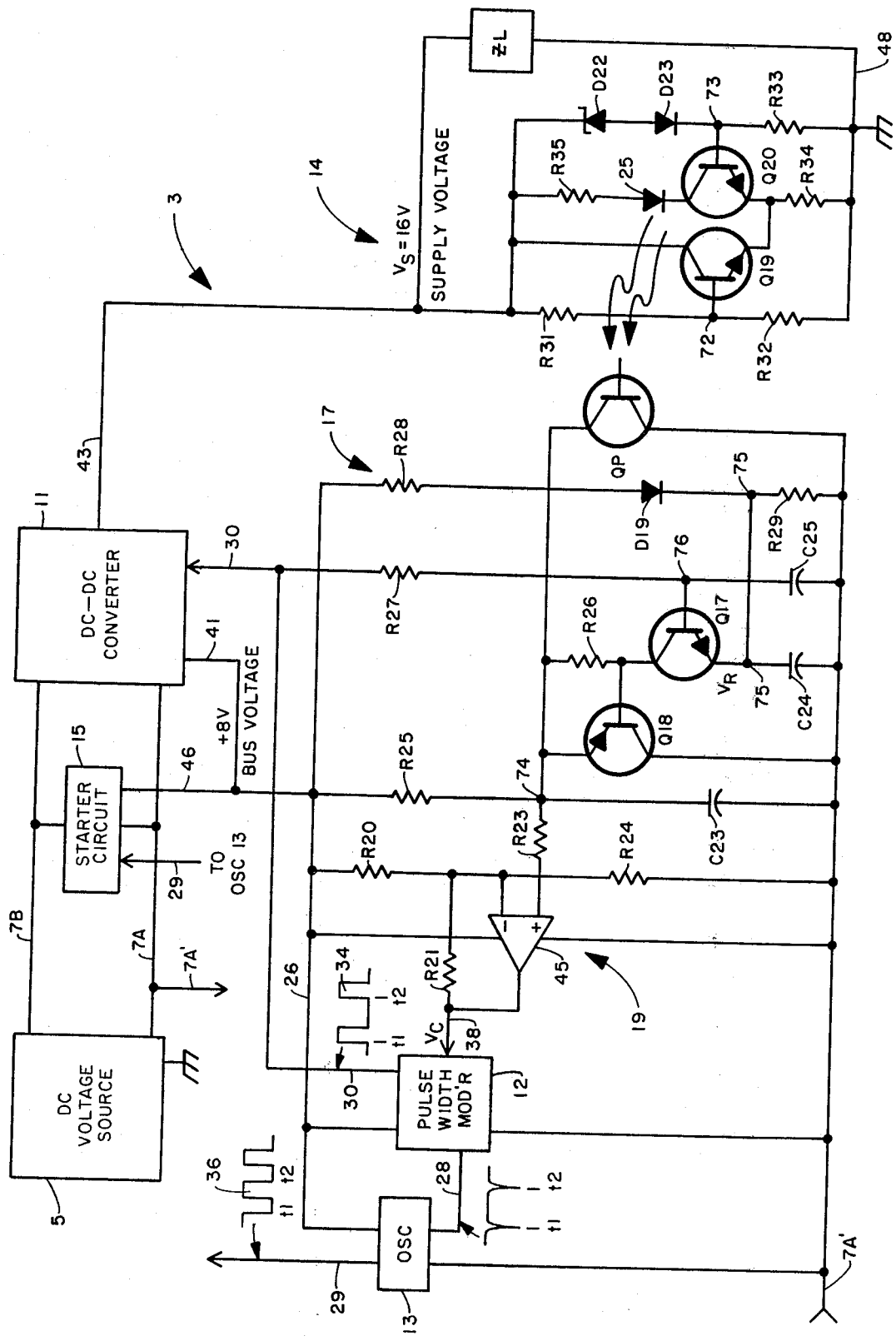

CURRENT LIMITER FOR SWITCHED DC-TO-DC CONVERTER

BACKGROUND OF INVENTION

This invention relates to a regulated power supply providing a relatively constant supply voltage to a load impedance, and more particularly to method and apparatus providing overload protection for a regulated power supply.

A power supply for converting an input line voltage to a relatively constant supply voltage of a different value that is applied to a load impedance generally comprises a DC-to-DC converter that is powered by input line current from an external voltage source, a pulse width modulator producing voltage pulses that drive the converter, and a voltage comparator. As the load impedance decreases, the supply voltage also decreases, as does the effective input impedance of the power supply. In order to maintain the supply voltage relatively constant under such load conditions, the comparator monitors the supply voltage for producing an error voltage that biases the modulator for increasing the width of voltage pulses, and thus the time interval that the converter draws line current. This operation causes the magnitude of line current drawn by the converter to increase. As the load impedance decreases from a light load (a high load impedance), the converter draws increasing values of line current and input power from the external source until the input impedance of the power supply is equal to the output impedance of the source. At this point, the source delivers maximum power to the power supply. Although a further decrease in load impedance causes the power supply to demand additional input power, the external source delivers additional input line current and less input power to the power supply. In order to prevent an overload condition (i.e., a low value of load impedance) locking-up the operation of the power supply such that it will not restore itself to normal regulation until it is entirely unloaded, the maximum value of line current must be limited. It is also desirable that the efficiency of the power supply be high so that maximum output power is delivered to the load. This is particularly important in a carrier subscriber telephone system where one power supply in a subscriber terminal services a plurality of subscriber station units (e.g., six) and associated handsets clustered at a common location. Since all of the six handsets are seldom off-hook at the same time in such an application, the load impedance under normal operating conditions typically varies from a high impedance such as 88 ohms when all handsets are on-hook to a low impedance such as 44 ohms when all six handsets are off-hook. A prior art current limiter senses the line current itself with a series resistor for limiting the maximum value thereof that is drawn by the power supply. This prior art technique wastes power in the series resistor which might better be converted to useful power that is delivered to the load.

An object of this invention is the provision of method and apparatus for indirectly sensing the magnitude of input current drawn by a power supply for limiting the maximum value thereof.

SUMMARY OF INVENTION

In a power supply including a DC-to-DC converter that produces a DC supply voltage and is driven by voltage pulses from a modulator that is responsive to an error voltage for varying the width of the voltage pulses (and thus the duty cycle of the converter) for maintaining the supply voltage relatively constant, method and apparatus embodying this invention monitors the voltage pulses for producing a time varying measure of the width thereof. When the measure exceeds a prescribed value, the width of voltage pulses is limited to a maximum value for establishing the maximum duty cycle of the converter and limiting the magnitude of input current drawn by the power supply.

PREFERRED EMBODIMENTS

The single FIGURE of drawing here is a schematic circuit and block diagram of a power supply 3 embodying this invention and energized by the output signal of an external source 5 of DC voltage. In an application where the power supply 3 services a plurality of channel units and associated handsets clustered at a single location in a carrier subscriber telephone system, the voltage source 5 may comprise a line terminating network having output terminals connected to lines 7A and 7B and input terminals connected on a cable pair of variable length to central office battery equipment. Since the length of the cable pair and associated equipment are not the same for all applications, the line terminating network includes a voltage regulator for converting a DC voltage on the cable pair that may vary from 120 V to 250 V to a relatively constant DC voltage of 120 V to 140 V on lines 7A and 7B. The output impedance of the source 5 is relatively large.

The power supply 3 comprises a DC-to-DC converter 11 that is driven by modulator 12, an oscillator 13, comparator circuit 14, starter circuit 15, and a control circuit 17. The feedback loop in the power supply comprises converter 11, comparator 14, amplifier 19, and modulator 12. This loop is designed to maintain the supply voltage $V_s$ relatively constant as the load impedance $Z_L$ varies. The circuits 11–15, other than the control circuit 17, are conventional.

This power supply is essentially a constant frequency switching regulator in which the length of the energy storage state of the converter is shortened or lengthened as the load impedance $Z_L$ increases and decreases, respectively. In an application where such a power supply serviced 6 channel units, the load impedance varied from 88 ohms when all 6 handsets were on-hook to 44 ohms when all 6 handsets were off-hook. It is desirable that the power supply maintain $V_s$ relatively constant, and also provide overload protection that limits line current drawn by the power supply to a maximum value such at 65 miliamperes at times other than initial start-up of the power supply.

The modulator 12 and oscillator 13 are energized by a DC supply voltage of approximately 7 V on bus 26. Such a bus voltage causes the oscillator to produce fixed frequency clock pulses on line 28 that key the modulator for fixing the times that it produces output voltage pulses 34 on line 30. The switching frequency of the modulator is preferably constant in order to accurately control the modulator pulse width and provide more efficient operation of the power supply. A DC control voltage $V_c$ on line 38 changes a threshold voltage in the modulator for varying the time interval for a charge voltage on a timing capacitor thereof to exceed this threshold voltage in order to vary the width of output pulses 34. As is described more fully hereinafter, a decrease in $Z_L$ causes an increase in $V_c$ and thus the width of the voltage pulses 34. Pulse width modulators are described in the articles "Packaged Pulse-Width Modulator Simplifies Series-Switching Regulator Design" by John Svalbe, Electronic Design 19, Sept. 14, 1972 page 162, and "Constant Period With Variable Duty Cycle Obtained From Timer With Single Control," by Rober W. Hilsher, Electronic Design 14, July 5, 1975, page 72. The oscillator also produces a buffered pulse output signal on line 29.

The converter 11 is energized by an input voltage on lines 7A and 7B and is responsive to voltage pulses 34 on line 30 for producing prescribed DC output signal voltages on lines 41–43. The converter may be a shunt swinging choke type switching converter including a transformer having a plurality of secondary windings that may be connected to associated rectifiers and regulators for producing the prescribed signal voltages. This type switching converter is described in "DC-DC Converter Using IC Timer" by Robert Solomon and Robert Broadway, Electronic Design News, Sept. 5, 1973, pages 87–91, and "Switching Supply Converts −60 V to +5 and −6.3 V With 83% Efficiency" by Philip M. Cowett, Jr., Electronic Design 2, Jan. 18, 1978, page 106. The 8 V DC supply voltage on line 41 is connected to bus 26 for powering the oscillator and modulator. The constant 16 V DC signal voltage $V_s$ on line 43 is applied to the load.

When the power supply is initially connected to a DC input voltage such as 140 V on lines 7A and 7B, starter circuit 15 is operative for producing a constant 7 V DC signal voltage on line 46 that raises the bus 26 voltage sufficiently to energize the oscillator and modulator for producing voltage pulses 34 on line 30. Voltage pulses 34 drive converter 11 for causing it to produce the 8 V bus signal on line 41 and bus 26 which then powers the oscillator and modulator. The starter circuit 15 is turned off by buffered output pulses 36 from the oscillator in order to conserve energy. The starter circuit 15 may comprise the emitter-collector path of a transistor and a Zener diode that are electrically connected in series across the input lines 7 as is a voltage divider having a tap connected to the base electrode of the transistor, its collector being connected to bus 26. The output line 29 of the oscillator is connected to the base of the transitor for turning it off.

The comparator circuit 14 comprises a DC bridge consisting of resistors R31, R32 and R33, junction diode D23, and a 5.6 V Zener diode D22, the comparison nodes 72 and 73 of the bridge being connected to associated base electrodes of differential amplifier transistors Q19 and Q20. The voltage divider R31-R32 divides a supply voltage $V_s = 16$ V down to approximately ⅖ $V_s = 6.4$ V at node 72. This means that approximately two-thirds of any change in $V_s$ is reflected to the Q19 base. A fixed voltage drop of approximately 6.2 V is developed across the Zener D22 and temperature compensating diode D23 for establishing a reference voltage of approximately 9.8 V at node 73 when $V_s = 16$ V. The full voltage change in $V_s$ will be translated to node 73 by this circuit arrangement. This means that approximately one-third of the change in $V_s$ is available for driving the differential amplifier Q19-Q20. The output of the differential amplifier is optically coupled from an LED (light emitting diode) 25 to an associated phototransistor Qp that conducts through R25. This circuit arrangement provides improved isolation and noise immunity in the power supply. The bias voltage at node 73 forwarded biases Q20 for providing an offset current in the LED which establishes conduction of Qp. The output of the comparator is filtered by C23 and amplified by differential operational amplifier 45 for producing the control voltage $V_c$ that drives the modulator.

The control circuit 17 measures the average value of the modulator output signal for limiting the maximum width of pulses 34 to a value allowing no more than a prescribed current to be drawn on lines 7A and 7B by the converter. The control circuit comprises bootstrap transistors Q17 and Q18; a voltage divider R28-D19-R29 that is connected between the bus 26 and line 7A' for establishing a reference voltage $V_R$ on the Q17 emitter electrode; and an integrator circuit R27-C25 connected between the modulator output line 30 and line 7A'. The temperature compensating diode D19 and resistors R28 and R29 divide an 8 V bus voltage down to approximately 2.3 V at node 75 and the Q17 emitter. The resistor R27 and capacitor C25 integrate the voltage pulses 34 for producing an indication of the average value thereof at node 76 and the Q17 base.

When the load impedance $Z_L$ is high the 16 V supply voltage $V_s$ on line 43 turns on Q19 and Q20 for causing the LED 25 and photo-transistor to establish a prescribed signal voltage at node 74 that is translated to line 38. The resultant control voltage $V_c$ causes the modulator to produce voltage pulses 34 having a width that is sufficient for driving the converter such that it produces the desired output voltage $V_s$. A decrease in $Z_L$ causes a decrease in $V_s$ and the net voltage applied to the differential amplifier. This decreases conduction of Q20, LED25, and Qp for increasing the voltage at node 74, the control voltage $V_c$ and thus the threshold voltage in the modulator. Since it now takes longer for the timing capacitor in the modulator to charge to this increased threshold voltage, the width of voltage pulses 34 increases. This causes the duty cycle of the converter to increase so that it draws current on lines 7A and 7B for a longer time interval and stores more energy in magnetic fields thereof for maintaining $V_s$ relatively constant. Thus, it is seen that the widths of voltage pulses 34 are proportional to and measures of the magnitude of central office line current drawn by the power supply. The elements R27-C25 continually integrate these voltage pulses 34 for producing a charge voltage on C25 that is a measure of the average value thereof. During normal load conditions, this charge voltage on C25 is not sufficient to turn on the bootstrap circuit.

If an overload is inadvertently applied across lines 43 and 48 the feedback circuit operates to increase the width of voltage pulses 34, the duty cycle of the converter, and the magnitude of line current drawn by the power supply. This operation also causes the charge voltage on C25 to increase. When this charge voltage raises the node 76 potential to approximately 2.8 V, the base-emitter junction diode of Q17 is forward biased (the node 75 is set at approximately 2.5 V by the voltage divider R28-D19-R29). This causes Q17 to conduct lightly. Since the overall gain of the bootstrap transistors is high, the small base current in Q17 causes Q18 to conduct heavily through R25 to gradually set the node 74 voltage at a fixed value. Any further increase in the width of voltage pulses 34 causes Q17 and Q18 to conduct more heavily in the active region to clamp node 74 to a fixed voltage which sets the maximum control voltage $V_c$, the maximum width of voltage pulses 34, the maximum duty cycle of of the converter, and thus the maximum line current drawn by the power supply and converter.

The control circuit 17 is designed to establish the current limiting function for a load impedance that is less than a certain value for which the equivalent input impedance of converter 11 is approximately equal to the equivalent output impedance of the source 5. A power supply embodying this invention was built and successfully operated for powering 6 channel units and associated handsets in the subscriber terminal of a carrier subscriber telephone system where the load impedance $Z_L$ varied from 88 ohms to 44 ohms when the 6 handsets were all on-hook and off-hook, respectively. The control circuit 17 there was designed to limit the potential at node 74 to a fixed value for a load impedance of 53 ohms, which corresponded to 4 handsets being off-hook and 2 on-hook. At this point, the power supply becomes a constant power source instead of a constant voltage source. Any further decrease in load impedance causes a fall-off in supply voltage $V_s$ on line 43. In this power supply, the control voltage $V_c$ varied between 5 V and 6 V, depending on the load. This caused the width of the pulses 34 to vary from approximately 2 to 6 microseconds, the latter pulse width corresponding to a 45% duty cycle since the clock pulse rate was 71 KHz.

Although this invention is described in relation to preferred embodiments thereof, variations and modifications will occur to those skilled in the art. By way of example, the power supply may be used in applications other than a carrier subscriber telephone system. Also, the magnitude of line current drawn by the power supply may be monitored by measuring the width of voltage pulses 34 rather than the average value thereof. This operation may be performed by analog techniques with a constant current ramp generator, or digitally with a resetable timing circuit or counter. Additionally, the bootstrap circuit may be replaced with digital gate circuitry for coupling one or the other of the output of comparator 14 and a fixed clamp voltage to node 74. Further, other types of comparator and starter circuits may be employed here. By way of example, the starter circuit 15 and line 41 may be eliminated by connecting the bus 26 to an 8 V DC signal from an external source when the converter is connected to lines 7A and 7B. Also, R29 may be replaced by a Zener diode. The scope of this invention is therefore determined by the appendant claims rather than the aforementioned detailed description.

What is claimed is:

1. In a power supply including a pulse width modulator; a DC-to-DC converter that is powered by input line current from an external source, is driven by voltage pulses from the modulator, and is operative for converting a DC input voltage from the source to a first DC voltage for driving a load impedance; and comparator means responsive to variations in the magnitude of the first voltage from a prescribed value for producing an error voltage for driving the modulator to vary the width of voltage pulses and thus the converter duty cycle and value of line current drawn by the converter, the improvement comprising:
    first means for producing a reference signal with a parameter having a value that is a measure of a maximum value of line current that is to be drawn by the power supply, and;
    second means responsive to the reference signal and to the voltage pulses for limiting the maximum width of the latter for limiting the maximum value of line current drawn by the power supply.

2. The improvement according to claim 1 wherein the reference signal is a reference signal voltage and the parameter is the amplitude thereof.

3. The improvement according to claim 2 wherein said second means limits the maximum width of voltage pulses only when the average value of the pulse voltage signal exceeds the reference voltage by a prescribed amount.

4. The improvement according to claim 3 wherein said second means comprises means for integrating the voltage pulses.

5. The improvement according to claim 4 including third means producing a second DC voltage that powers the modulator, and wherein said first means comprises means electrically connected between the second DC voltage and a ground reference potential for producing the reference voltage at a node there-between.

6. The improvement according to claim 5 wherein said reference voltage means comprises a Zener diode electrically connected between the ground reference potential and the node at which the reference voltage is produced, the reference voltage corresponding to the Zener voltage.

7. The improvement according to claim 5 wherein said reference voltage means comprises voltage divider means electrically connected between the second voltage and ground for producing the reference voltage at a node therebetween.

8. The improvement according to claim 5 wherein the error voltage from the comparator means is coupled to said second means which comprises: an active element having a first electrode electrically connected to the reference voltage, a second electrode electrically connected to a common node receiving the error voltage, and a control electrode electrically connected to said integrating means; and means coupling the voltage on said common node to the modulator, said active element being nonconducting when the average voltage produced by said integrating means is greater than the reference voltage by less than a prescribed amount so that said coupling means couples the error voltage to the modulator; said active element conducting in other than the saturation region when the reference voltage is less than the average voltage by greater than the prescribed amount for establishing the signal voltage level on the common node at a particular value that said coupling means couples to the modulator and that limits the maximum width of voltage pulses.

9. The improvement according to claim 1 wherein said second means comprises third means producing an indication of the width of voltage pulses and fourth means limiting the maximum width of voltage pulses when the value of the indication exceeds the value of the parameter by a prescribed amount.

10. An improved method of limiting the maximum value of line current drawn from an external source by a power supply including a pulse width modulator driving a DC-to-DC converter that is powered by the line current and operative for converting a DC line voltage to a DC supply voltage that powers a load impedance, and comparator means responsive to variations in the magnitude of the supply voltage for producing an error voltage that drives the modulator to vary the width of voltage pulses therefrom, and thus the duty cycle of the converter, for maintaining the supply voltage relatively constant, comprising the steps of: producing a time varying measure of the width of the voltage pulses, and limiting the maximum pulse width of the modulator for establishing the maximum duty cycle of the converter and thus the maximum line current drawn by the power supply, when the measure exceeds a prescribed value.

11. The method according to claim 10 wherein the measure is of the average value of the pulse voltage signal.

12. The method according to claim 11 including the additional step of producing a reference signal having a parameter with a value that is a measure of the maximum line current that is to be drawn by the power supply, said value of the parameter being the prescribed value.

* * * * *